R. HOYT.
DIVIDING APPARATUS.
APPLICATION FILED SEPT. 22, 1904.

970,826.

Patented Sept. 20, 1910.
4 SHEETS—SHEET 1.

WITNESSES:
Edward Thorpe

INVENTOR
Roscoe Hoyt
BY
ATTORNEYS

R. HOYT.
DIVIDING APPARATUS.
APPLICATION FILED SEPT. 22, 1904.

970,826.

Patented Sept. 20, 1910.
4 SHEETS—SHEET 3.

WITNESSES:
Edward Thorpe

INVENTOR
Roscoe Hoyt
BY
ATTORNEYS

R. HOYT.
DIVIDING APPARATUS.
APPLICATION FILED SEPT. 22, 1904.
970,826.
Patented Sept. 20, 1910.
4 SHEETS—SHEET 4.
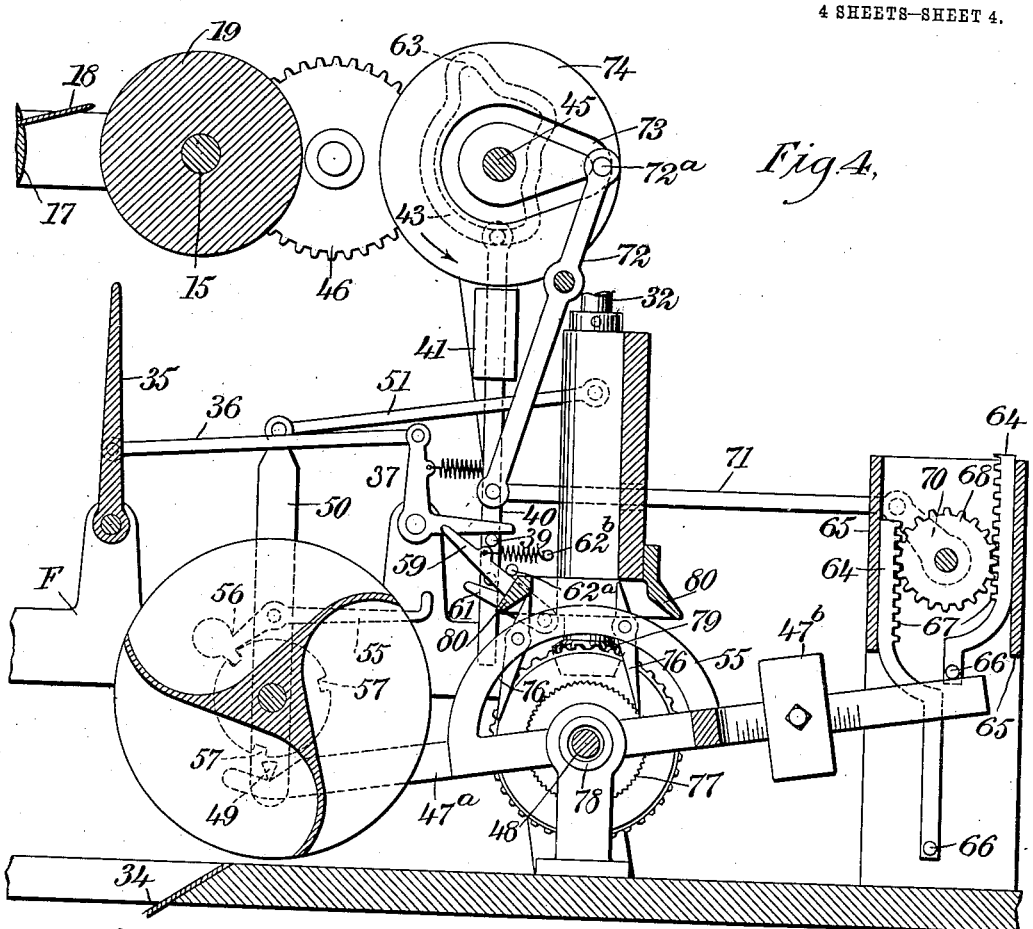
Fig. 4.
Fig. 5.
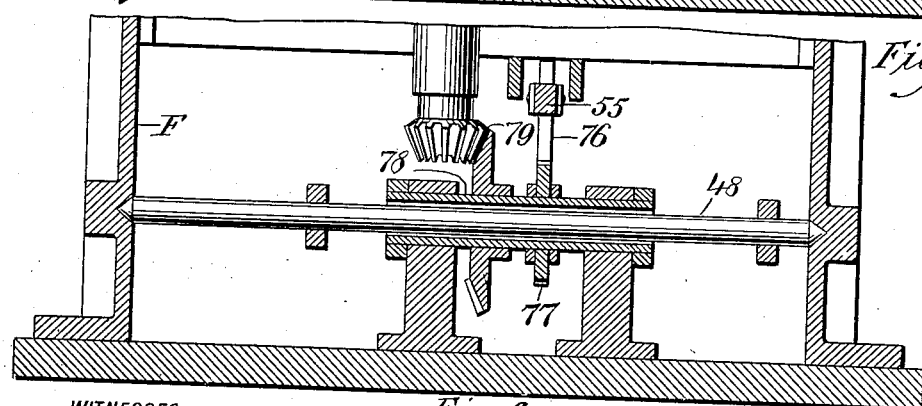
Fig. 6.
WITNESSES:
Edw. Thorpe,
INVENTOR
Roscoe Hoyt
BY
ATTORNEYS

UNITED STATES PATENT OFFICE.

ROSCOE HOYT, OF NEW YORK, N. Y.

DIVIDING APPARATUS.

970,826.  Specification of Letters Patent.  Patented Sept. 20, 1910.

Application filed September 22, 1904. Serial No. 225,453.

*To all whom it may concern:*

Be it known that I, ROSCOE HOYT, a citizen of the United States, and a resident of the city of New York, borough of Brooklyn, in the county of Kings and State of New York, have invented a new and Improved Dividing Apparatus, of which the following is a full, clear, and exact description.

My invention relates to apparatus for dividing material into definite quantities, it being especially adapted for separating such a plastic as dough into lumps of a substantially fixed weight. Its principal objects are to provide a convenient machine which will automatically perform operations of this character.

It consists in the various features and combinations hereinafter described and claimed.

Reference is to be had to the accompanying drawings forming a part of this specification, in which similar characters of reference indicate corresponding parts in all the views.

Figure 1:
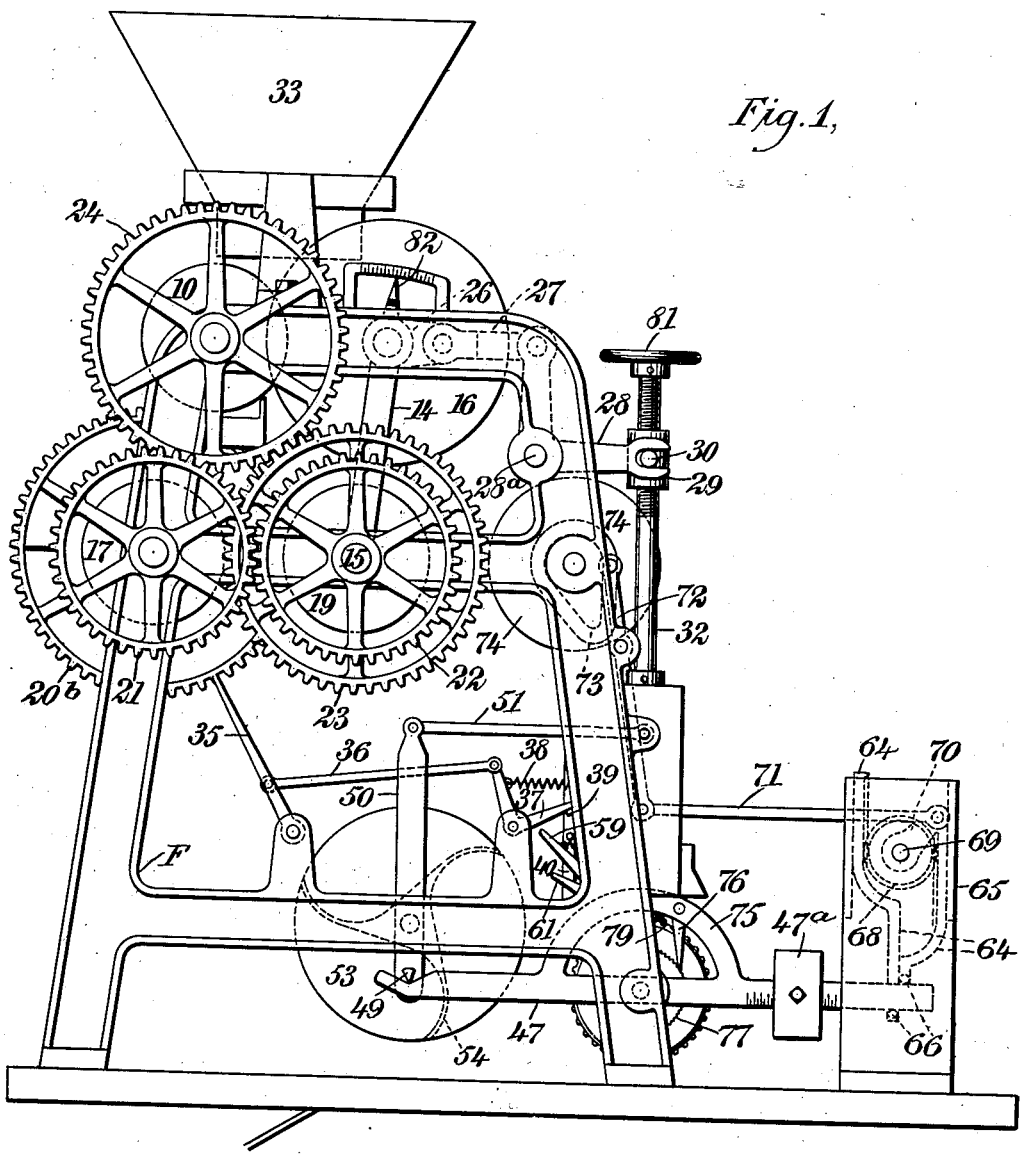
Figure 2:
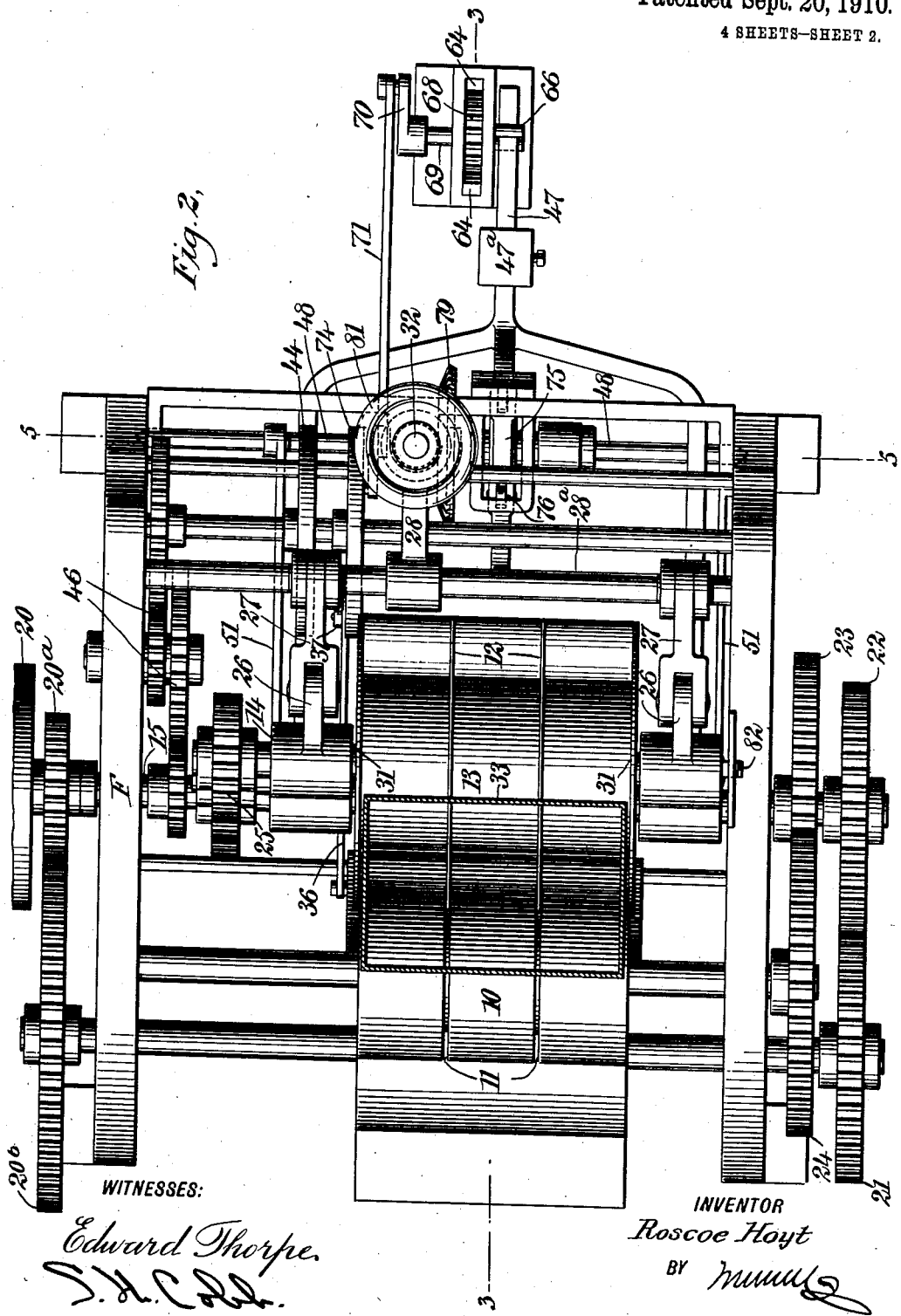
Figure 3:
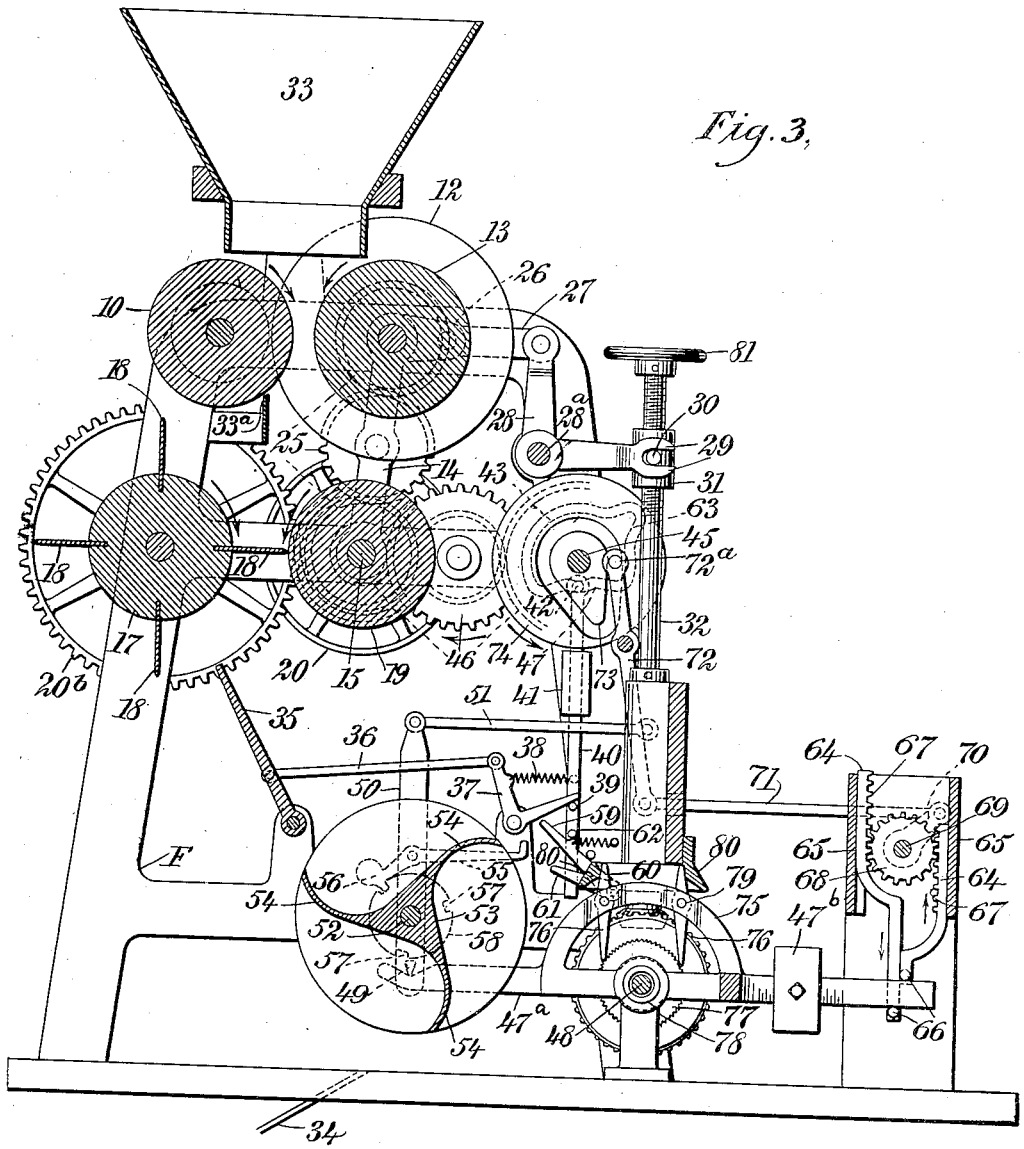

Figure 1 is a side elevation of one embodiment of my invention; Fig. 2 is a top plan view thereof, parts being broken away; Fig. 3 is a vertical longitudinal section, on the line 3—3 of Fig. 2; Fig. 4 is an enlarged sectional detail of the weighing mechanism and more closely associated parts; Fig. 5 is a transverse sectional detail, on the line 5—5 of Fig. 2; and Fig. 6 shows one form of the upper dividing rolls.

F designates the frame upon which is mounted the dividing means, here shown as consisting of a plurality of pairs of rolls, preferably two in number and arranged vertically one above the other. The upper pair consists of a roll 10, the shaft of which is journaled in fixed bearings in the frame, said roll being provided with circumferential grooves 11, dividing the roll into equal portions. Into these grooves extend blades or knives 12, carried upon the periphery of the companion roll 13, the shaft of which is journaled in arms 14 rotatable about a shaft 15 journaled in the frame. At the ends of the roll 13 are disks or cheek-pieces 16, furnishing end walls between which the material operated upon is retained while being cut. Journaled in the frame, below the roll 10, is the roll 17 of the second pair, preferably having its shaft rotatable in fixed bearings in the frame and having longitudinally extending blades or knives 18, which, as illustrated are four in number. These knives co-act with the surface of a companion roll 19 which is fixed upon the shaft 15. Rotatably mounted upon one end of the shaft 15 is a driving pulley 20, having turning with it a pinion $20^a$ which drives a gear $20^b$ fast upon the shaft of the roll 17. At the opposite end of the roll 17 is secured a gear 21 which meshes with a gear 22 fixed upon the shaft 15. This shaft also carries a gear 23 coöperating with a gear 24 upon the shaft of the roll 10. The roll 13 may be rotated by a train of gearing 25, situated at the opposite end of the roll 19. The resulting rotation is indicated by the arrows in Fig. 3 of the drawings.

Each of the arms 14 has at or near its upper end a projection 26, which is connected by a link 27 with an angle-lever 28 fulcrumed at $28^a$ upon the frame. This lever in its other end is shown as bifurcated, its forked portions 29 embracing projections 30 at opposite sides of a nut 31 operating upon the threaded portion of a shaft 32. This engagement retains the roll 13 in position and permits its adjustment toward and from the companion roll, as will be hereinafter described.

Above the upper pair of rolls is mounted a hopper 33, to which is supplied the mass of material to be divided. As it passes downward it is first cut by the circumferential knives 12 into strips of equal width, and then by the longitudinal knives 18 these strips are separated into sections of equal length. If at any point the material tends to adhere to the rolls, a doffer may be provided, there being here illustrated a blade $33^a$ in connection with the roll 10. Normally the cut pieces fall upon a chute 34 and are directed to any desired receptacle. To determine the weight of the pieces and to allow them to be corrected or brought to a standard, one or more of these will be occasionally abstracted. In the present instance, these pieces are thus weighed, but this number may vary with the strips formed. From the method employed, as will appear hereinafter, the error of the weighing mechanism arising from its resistance to movement, will be inversely proportioned to the number of pieces weighed. For this purpose a delivery member or board 35 is provided, pivoted below the rolls and connected by a link 36 with an angle lever 37 fulcrumed upon the frame and normally held with the delivery board out of the path of the falling material by a spring 38. With the lever 37 coöperates a pin or projection 39, carried by an actuating member or bar 40, which is movably mounted in a guide 41. At the upper extremity of this actuating bar is shown a projection 42, extending into a cam-groove 43 formed in a disk 44. This disk is fast upon a shaft 45, which is rotatable by a train of gearing 46 from the shaft 15. The cam-groove, which is concentric with the shaft for part of its length, has a reëntrant portion 47, which raises the bar into contact with the angle-lever and moves the delivery-board beneath the lower pair of rolls. The movement just described directs the cut pieces to scale mechanism, which may consists of a beam $47^a$ carrying the usual weight $47^b$ with its associated scale and being fixed upon a pivot shaft 48, rotatable in the frame. This beam has at one end a depression to receive knife-edges 49 of supports 50, which are preferably maintained in a substantially vertical position by links 51, pivotally connected to the frame. Between the supports extends a shaft 52, upon which is mounted a rotatable pan 53 which may be divided into a suitable number of receptacles, conveniently three, by curved arms 54. This pan may be locked with one of the receptacles in position to receive the material deflected by the delivery-board by a latch 55, the weighted end 56 of which engages one of a series of notches 57 in a disk 58 fixed to the shaft 52. This latch may be tripped by an arm 59, movable about a stud 60 projecting from the frame and having connected with it a shorter arm 61 with which may contact a pin or projection 62 carried upon the bar 40 below the pin 39. The arm 59 may be held normally raised against a stop $62^a$ by a spring $62^b$. The cam-groove 43, beyond the reëntrant portion, has a projecting portion 63, which moves this pin 62 against the arm 61. The relations of the cam portions of the groove to one another is such that this release of the pan and its rotation by the weight of the material contained in one of the receptacles occurs after a suitable interval has been allowed for the weighing operation. When such rotation takes place, the piece is discharged from the pan upon the chute and the succeeding receptacle comes into position to receive the next pieces, which is diverted from the general course of the material.

The scale beam is preferably moved to its normal horizontal position and there automatically locked by vertical bars or members 64, sliding in guides 65. At the lower ends of these bars are projections or pins 66, situated above and below the beam and on the inner side of each bar is shown a rack 67, with both of which meshes a pinion 68 fixed upon a shaft 69 rotatably mounted in the frame. At one extremity of this shaft is an arm 70, with which is connected a link 71 having its opposite end articulated to a lever 72 fulcrumed upon the frame and having a projection $72^a$ operating in a cam-groove 73 formed in a disk 74. This disk is preferably rotatable with the shaft 45. The form and angular position of the cam-groove 73 is such that after the cut pieces have been deposited in a receptacle of the pan the pinion is rotated, to move both the bar projections from the scale beam, thus leaving it free for the weighing operation. When this has been completed the bars are simultaneously moved in the opposite direction, returning the scale beam to its normal position. Rising above the beam is shown a sector 75, upon which are pivoted opposite pawls 76 which may co-act with a ratchet wheel 77 fixed upon a sleeve 78 journaled in the frame and surrounding the pivot shaft of the scale beam. This sleeve may be connected by bevel gearing 79 with the vertical shaft 32. The position of the pawls with regard to the ratchet wheel is such, that when the scale beam occupies its horizontal position they are both out of contact with the ratchet teeth, but if the beam tilts in either direction one of them will be moved away from the edge of the ratchet wheel while the other will swing into co-action with it, as is particularly shown in Figs. 3 and 4. When it is returned to its normal position by the bars 64 the upper pawl, engaging the ratchet teeth, rotates the vertical shaft through the gearing, which results in the nut 31 moving longitudinally thereon. This rocks the lever 28, moving the roll 13 toward or from the roll 10, thus varying the space between them and therefore the thickness of the strips which are cut by the circumferential knives. Before the return of the beam has been completed the upper end of the active pawl comes into contact with a stop-member 80, of which there may be two, projecting from the frame at each side of the sector. This insures the disengagement of the pawl from the ratchet wheel at the end of its operation. The upper extremity of the shaft 32 is preferably provided with a hand wheel 81, by which a manual adjustment of the relations of the rolls may be secured, and as a guide for this movement one of the arms 14 may carry a pointer or index 82 moving over a suitable scale.

In the use of the apparatus, the upper rolls are adjusted by the hand wheel and the index and scale to give such a space between them that the resulting strip, when cut into pieces by the longitudinal knives of the second pair of rolls, will be of a standard or the desired weight. The shaft 15 is now rotated and the plastic material continuously supplied through the hopper. The cut pieces will fall upon the chute save when at intervals the delivery-board is moved into their path by the projection 39 upon the actuating member, when one set of the pieces will fall into a receptacle of the weighing pan. Then the scale beam will be automatically released by the separation of the locking bars, and if the pieces are of the correct weight the beam will remain in a horizontal position and there will be no movement of the roll 13. If, however, the pieces are too light or too heavy, the beam will swing in one direction or the other, bringing one of the pawls into such position that, upon the return of the beam to the horizontal by the locking members, it will rotate the threaded shaft and cause the nut thereon to be fed along it. As a consequence the roll 13 will move toward or from its companion, to increase or diminish the width of the intermediate space by the proper amount. After this has occurred the projection 62 of the rod 40 operates to trip the latch, releasing the pan, which rotates under the weight of the contained pieces, this falling upon the chute. The pan is then locked by the latch with the next receptacle in position to receive the discharge from the delivery-board and after a suitable interval the operation of weighing and varying the position of the roll to correct the weight is repeated. This is carried on automatically, it being only necessary to maintain a supply of the material operated upon in the hopper.

Instead of delivering substantially rectangular pieces, such as will result from the arrangement of rolls hereinbefore described, they may be of curved cross-section, this being attained by making the faces of the upper rolls concave, as is shown at 83 in Fig. 6.

Having thus described my invention, I claim as new and desire to secure by Letters Patent:

1. A machine for dividing plastic material comprising means for dividing the material into strips, means for dividing the strips into separate portions, and means automatically controlled by the weight of a portion for adjusting the position of one of the dividing means.

2. A machine for dividing plastic material comprising a plurality of pairs of rolls, one of said pairs being provided with a circumferential blade and another pair having a longitudinal blade, and means automatically controlled by the weight of material passed between the rolls for adjusting the position of one of the first-named pair.

3. A machine for dividing plastic material comprising an upper pair of coacting rolls provided with circumferential blades, a lower pair of rolls, one of which has longitudinal blades, means for adjusting the position of one of said rolls, and means connected thereto and controlled by the weight of material passed between the lower rolls for controlling said adjusting means.

4. The combination with means for dividing material into portions, one part of said means being movable, of means controlled by the weight of a portion separated by said dividing means, for automatically adjusting the position of said movable part of the dividing means.

5. The combination with means for dividing material into portions, one part of said means being movable, of power-operated means controlled by the weight of a divided portion for adjusting the position of the dividing means.

6. The combination with means for dividing material into portions, one part of said means being movable, of weighing mechanism to which a divided portion may be delivered, and means controlled by the weighing mechanism for adjusting the position of the dividing means.

7. The combination with means for dividing material into portions, one part of said means being movable, of weighing mechanism to which a portion may be delivered, means for locking the weighing mechanism in its normal position, and means controlled by the weighing mechanism for adjusting the position of the dividing means.

8. The combination with means for dividing material into portions, one part of said means being movable, of weighing mechanism to which a portion may be delivered, and means controlled by the weighing mechanism during its return to the normal position for adjusting the position of the dividing means.

9. The combination with means for dividing material into portions, one part of said means being movable, of weighing mechanism to which a portion may be delivered, automatic means for locking the weighing mechanism in its normal position, and means controlled by the weighing mechanism for adjusting the position of the dividing means.

10. The combination with means for dividing material into portions, one part of said means being movable to vary the size of the portions, of means for adjusting the position of the dividing means, means controlled by the weight of a divided portion for controlling said adjusting means, and a movable delivery member disposed between said dividing means and said controlling means.

11. The combination with movable means for dividing material into portions, of a scale-beam, a movable receptacle carried by the scale-beam and to which a portion may be delivered, and means for transmitting the movement of the scale-beam to the dividing means.

12. The combination with movable means for dividing material into portions, of a scale-beam, a rotatable receptacle carried by the scale-beam and to which a portion may be delivered, and means for transmitting the movement of the scale-beam to the dividing means.

13. The combination with movable means for dividing material into portions, of a scale-beam, a movable receptacle carried by the scale-beam and to which a portion may be delivered, a latch for fixing the position of the receptacle, and means for transmitting the movement of the scale-beam to the dividing means.

14. The combination with movable means for dividing material into portions, of a scale-beam, a movable receptacle carried by the scale-beam and to which a portion may be delivered, a latch for fixing the position of the receptacle, automatic tripping mechanism for the latch, and means for transmitting the movement of the scale-beam to the dividing means.

15. The combination with a pair of rolls, one of which is movable, of means to which the material passed between the rolls is delivered for adjusting the movable roll, and connections between said adjusting means and roll.

16. The combination with a pair of rolls, one of which is movable, of weighing mechanism to which material passing between the rolls may be delivered, ratchet mechanism connected with the scale mechanism, a threaded shaft rotatable by said ratchet mechanism, a nut operating upon the shaft, and lever mechanism connecting the nut and movable roll.

17. The combination with a pair of rolls, one of which is movable, of weighing mechanism to which material passing between the rolls may be delivered, connections between the weighing mechanism and movable roll including ratchet mechanism, and power-operated means for returning the scale mechanism to its normal position.

18. The combination with a pair of rolls, one of which is movable, of weighing mechanism to which material passing between the rolls may be delivered, connections between the weighing mechanism and movable roll whereby such movement is effected, and a movable delivery member interposed between the rolls and weighing mechanism.

19. The combination with a pair of rolls, one of which is movable, of weighing mechanism to which material passing between the rolls may be delivered, connections between the weighing mechanism and movable roll whereby such movement is effected, a delivery member interposed between the rolls and power-operated means for moving the delivery member.

In testimony whereof I have signed my name to this specification in the presence of two subscribing witnesses.

ROSCOE HOYT.

Witnesses:
EMILY LONG,
JNO. M. RITTER.